(12) United States Patent
Jensen et al.

(10) Patent No.: US 8,592,575 B2
(45) Date of Patent: Nov. 26, 2013

(54) PROCESS FOR EXTRACTION OF PECTIN

(75) Inventors: Søren Vodstrup Jensen, Lille Skensved (DK); Susanne Oxenbøll Sørensen, Vallensbæk Strand (DK); Claus Rolin, Koege (DK)

(73) Assignee: CP Kelco ApS (DK)

(*) Notice: Subject to any disclaimer, the term of this patent is extended or adjusted under 35 U.S.C. 154(b) by 111 days.

(21) Appl. No.: 13/154,381

(22) Filed: Jun. 6, 2011

(65) Prior Publication Data
US 2012/0309946 A1     Dec. 6, 2012

(51) Int. Cl.
*C07H 1/06* (2006.01)
*C07H 1/08* (2006.01)

(52) U.S. Cl.
USPC .......................................................... 536/128

(58) Field of Classification Search
None
See application file for complete search history.

(56) References Cited

U.S. PATENT DOCUMENTS

| | | | |
|---|---|---|---|
| 4,016,351 A * | 4/1977 | Eschinasi ......................... | 536/2 |
| 4,268,533 A | 5/1981 | Williams et al. | |
| 4,461,890 A | 7/1984 | Manabe et al. | |
| 6,143,346 A | 11/2000 | Glahn | |
| 6,172,030 B1 | 1/2001 | Wada et al. | |
| 6,207,194 B1 | 3/2001 | Glahn | |
| 6,777,000 B2 | 8/2004 | Ni et al. | |
| 6,855,363 B1 | 2/2005 | Buchholt et al. | |
| 7,691,986 B2 | 4/2010 | Ni et al. | |
| 2003/0064143 A1 | 4/2003 | Gerrish et al. | |
| 2005/0176677 A1 | 8/2005 | Dal Farra et al. | |
| 2006/0099302 A1 * | 5/2006 | Christensen .................... | 426/50 |
| 2006/0171996 A1 | 8/2006 | Sakai | |
| 2007/0202233 A1 | 8/2007 | Kato et al. | |
| 2009/0110798 A1 | 4/2009 | Gusek et al. | |

FOREIGN PATENT DOCUMENTS

| | | | |
|---|---|---|---|
| CN | 85105165 | A | 4/1987 |
| CN | 87100163 | A | 7/1988 |
| CN | 1100106 | A | 3/1995 |
| CN | 1310186 | A | 8/2001 |
| CN | 101518335 | A | 9/2009 |
| EP | 2014682 | A1 | 1/2009 |
| GB | 556808 | A | 10/1943 |
| RU | 2101294 | C1 | 1/1998 |
| RU | 2119497 | C1 | 9/1998 |
| RU | 2123266 | C1 | 12/1998 |
| RU | 2140927 | C1 | 11/1999 |
| RU | 2157380 | C2 | 10/2000 |
| RU | 2244441 | C2 | 1/2005 |
| RU | 2295260 | C2 | 3/2007 |
| RU | 2346465 | C1 | 2/2009 |
| WO | 9115517 | A1 | 10/1990 |
| WO | 9749298 | A1 | 12/1997 |
| WO | 0039168 | A1 | 7/2000 |
| WO | 2004020472 | A2 | 3/2004 |
| WO | 2010006621 | A1 | 1/2010 |

OTHER PUBLICATIONS

Joye et al. Carbohydrate Polymers 43 (2000) 337-342.*
Yuldasheva et al., "Pectin Substances of Sugar Beet Pulp", Chemistry of Natural Compounds, vol. 30, No. 4, 1994, CP002680786.
International Search Report for PCT/EP2012/055425, mailed Aug. 8, 2012.
Written Opinion of the International Searching Authority for PCT/EP2012/055425, mailed Aug. 8, 2012.
Rolin, et al., "Pectin", Chapter 12 in S. Dumitriu (ed.), Polysaccharides Structural Diversity and Functional Versatility, Marcel-Dekker, Inc. NY, 1998.
Devaries, et al., Carbohydr. Polym. 4, 1984, 89.
Koubala, et al., Food Chemistry, 106, 2008, 1202.
Koubala, et al., Intern. Journal Food Science Technology, 44, 2009, 1809.
Fishman,et al., Food Hydrocol., 20, 2006, 1170.

* cited by examiner

*Primary Examiner* — Layla Bland
(74) *Attorney, Agent, or Firm* — Sutherland, Asbill & Brennan LLP

(57) ABSTRACT

Embodiments of the processes provided herein allow for extraction of high quality pectins from pectin-containing plant materials using oxalic acid for extraction of the pectin containing material. Generally described, the process for extracting pectin having a high degree of polymerization includes preparing an aqueous suspension of a pectin-containing plant material; adding oxalic acid and/or a water-soluble oxalate to the aqueous suspension in an amount sufficient to provide a mixture having a pH of between 3.0 and 3.6 and a total molarity of oxalate greater than a total molarity of calcium(II); heating the mixture to a temperature from about 50 to about 80° C. for a time sufficient to extract pectin from the pectin-containing plant material; and separating the extracted pectin from the mixture. The extracted pectin desirably is characterized as having a degree of esterification (DE) of at least 72 and a high degree of polymerization, the degree of polymerization being characterized by an intrinsic viscosity of greater than about 6.5 dL/g.

20 Claims, 7 Drawing Sheets

PROCESS FOR EXTRACTION OF PECTIN

TECHNICAL FIELD

Embodiments of the present description relate to methods for extraction of high quality pectins. In particular, the present description relates to low-temperature processes for extraction of pectin from citrus peels that avoids significant degradation of pectin during the extraction process.

BACKGROUND

Pectin is a complex polysaccharide associated with plant cell walls. It consists of an alpha 1-4 linked polygalacturonic acid backbone intervened by rhamnose residues and modified with neutral sugar side chains and non-sugar components such as acetyl, methyl, and ferulic acid groups. The neutral sugar side chains, which include arabinan and arabinogalactans, are attached to the rhamnose residues in the backbone.

A significant amount of research on pectins has been carried out due to its importance as a food product, a dietary fiber and a component of cell walls in higher plants, and to the growing awareness of a number of pharmacological activities. Current methods of extracting pectin, however, do not produce pectins of sufficient quality for all such uses.

Conventional methods of pectin extraction require extended heating of the pectin-containing plant materials at sub-boiling temperatures (approximately 65-85° C.) in an acidic media (pH below 2.2) for 1 to 10 hours. These processes, however, have high residence times and energy requirements and may provide only a moderate yield (20-30%) of pectin using a counter-current process (i.e., a process using a number, n, of extraction stages with which the originating raw material goes to extraction stage #1, the originating pure water goes the stage #n, and for any stage #i, assuming 1<i<n, the liquid comes from stage i+1 while the solids come from stage i−1). Thus, since the acidic condition is aggressive, and since a considerable part of the pectin becomes exposed to the acidic condition repeatedly, the pectins often are degraded during the conventional extraction processes.

As will be appreciated by those skilled in the art, it is desirable to extract a pectin having as high a degree of polymerization (DP) as possible for as low a cost as possible. The selection of production conditions like solid/liquid ratio, acidity, temperature, etc. all effect these conflicting considerations. For example, in order to accomplish an even moderately high yield using conventional processes, extraction conditions must be aggressive. In addition, following the extraction, the solids-liquid separation should be as complete as possible because the liquid that is retained by the solids after the separation will be exposed to the aggressive extraction conditions for a second time (due to the counter-current extraction setup). For the separation to be as complete as possible, however, the viscosity of the liquid preferably should be low, which is accomplished either by separating at high temperature, separating with a low solids/liquid ratio, or a combination of both. Use of a high temperature in combination with a low pH, however, is detrimental to the pectin quality (e.g., its degree of polymerization). Conversely, a low solids/liquid ratio becomes costly because larger amounts of water need to be removed from the pectin either by evaporation or by distillation of alcohol. Thus, there remains a need for a cost-effective process for extracting pectins without compromising the quality of the extracted pectins.

In addition, it is also important that the final pectin is free from unwanted contaminants, including any residual presence of the acid (and its salts) that was used for extracting the pectin. Thus, there also is a need in the pectin manufacturing industry for cost-effective ways of reducing the residual presence of the acids that were added for the extraction.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
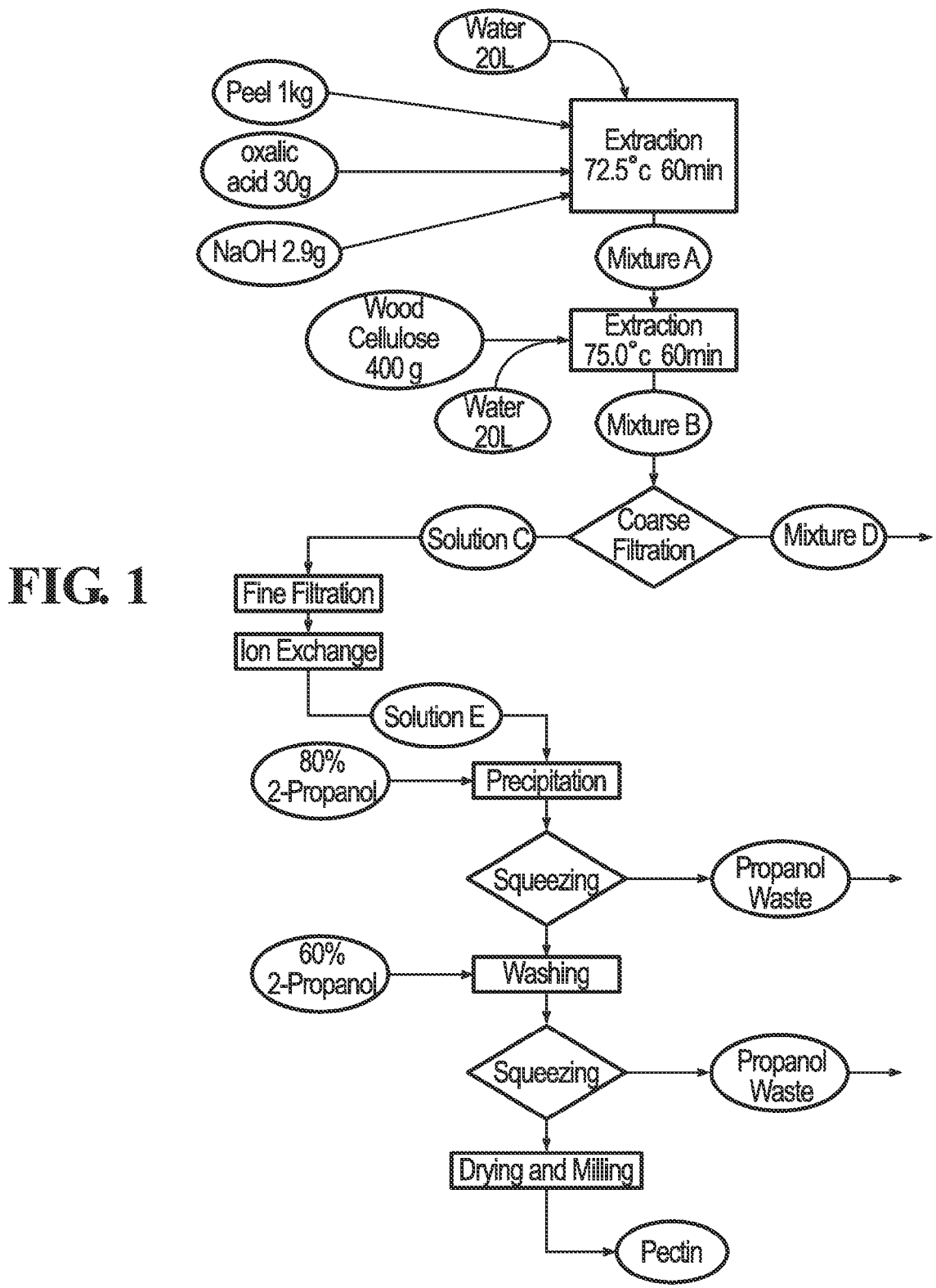
FIG. 1 is a schematic illustration of a system for extracting pectin according to a particular embodiment.

Embodiments of the present invention relate to methods for extraction of high quality pectins from pectin-containing plant materials using oxalic acid for extraction of the pectin containing material. Generally described, a process for extracting pectin having a high degree of polymerization in a single-stage extraction comprises preparing an aqueous suspension of a pectin-containing plant material; adding oxalic acid and/or a water-soluble oxalate to the aqueous suspension in an amount sufficient to provide a mixture having a pH of between 3.0 and 3.6 and a total molarity of oxalate greater than a total molarity of calcium(II); heating the mixture to a temperature from about 50 to about 80° C. for a time sufficient to extract pectin from the pectin-containing plant material; and separating the extracted pectin from the mixture. The extracted pectin desirably is characterized as having a degree of esterification (DE) of at least 72 and a high degree of polymerization, the degree of polymerization being characterized by an intrinsic viscosity of greater than about 6 dL/g.

Pectin-containing plant materials are well-known in the art and include fresh and processed materials as well as plant residues. Desirably, the pectin-containing plant material is a fruit, non-limiting examples of which include stone fruits such as peaches, pome fruits such as apples, and citrus fruits such as limes, lemons, oranges and grapefruit. The material may be prepared for extraction using any suitable means and any suitable portion of the pectin-containing plant material, for example, by juicing, peeling, coarsely chopping, milling or grinding the pectin-containing plant material or portions thereof. In particular embodiments, the pectin-containing plant material is the fruit peel. The fruit peel of a citrus fruit, as used herein, means the flavedo, albedo, and juice sacks (pulp sacks) which remain after juicing the fruit. In alternative embodiments, the pectin-containing plant material is one or more portions of the fruit peel (e.g., the albedo, fractions of albedo, juice sacks, or combinations thereof).

In embodiments, oxalic acid and/or a water-soluble oxalate are added to an aqueous solution of the pectin-containing plant materials. The pectin-containing plant materials generally are present in an amount from about 2 to about 5% by weight of the mixture. The oxalic acid and/or water-soluble oxalate are present in an amount from about 20 to about 50 g per kg dry material of the pectin-containing plant material. Desirably, the mixture has a pH between 3.0 and 3.6, a pH between 3.1 and 3.4, or a pH between 3.2 and 3.3. The mixture also desirably has a total molarity of oxalate greater than a total molarity of calcium(II). Those skilled in the art will appreciate that along with the oxalic acid and/or water-soluble oxalate, the pH of the mixture can be modified with the addition of minor amounts of suitable bases (e.g., NaOH) or acids (e.g., nitric acid) using methods known in the art.

The pectin then is extracted from the pectin-containing plant materials by heating the mixture to a temperature from about 50 to about 80° C. for a time sufficient to extract the pectin. During the pectin extraction, the mixture desirably is gently stirred and/or agitated using methods known to those skilled in the art. In particular embodiments, the mixture is heated to a temperature from about 60 to about 80° C. or to a temperature from about 70 to about 80° C. Although the yield generally increases with the time of extraction, the time preferably is minimized to reduce any loss in the degree of polymerization in the pectin being extracted. Accordingly, in particular embodiments a time sufficient to extract the pectin is from about 0.5 hours to about 5 hours, from about 1 hour to about 3 hours, or from about 1.5 hours to about 2.5 hours.

Following extraction of the pectin from the pectin-containing plant materials, insoluble solids (i.e., the residue of the pectin-containing plant material) may be removed from the mixture of the extracted pectin using any suitable means, for example, by one or more filtering steps (e.g., coarse and/or fine filtration). The extracted pectin then may be precipitated from the mixture, for example by pouring the extract into an effective amount of alcohol. Useful alcohols include, but are not limited to, any alcohol which is compatible with food applications and which effectively precipitates pectins and dissolves alcohol-soluble materials. In particular embodiments, the alcohols are isopropyl alcohol, propanol, ethanol, or methanol. Following precipitation, the extracted pectin may be separated from the solution and washed with alcohol to remove as many alcohol-soluble impurities as possible. The pectin then may be dried and processed into a powder or further modified (e.g., de-esterified and/or amidated) using methods known in the art.

In still other particular embodiments, residues may be removed from the extracted pectin either prior to or after its separation from the alcohol-water mixture. Such residues may include, for example, small amounts of the oxalic acid and oxalate residues that were used for the extraction. Although a moderate presence of conventional acids (e.g., nitric acid) used in extraction processes generally is accepted, oxalic acid residues likely would only be permissible in very low amounts due to a lack of prior regulatory use and evaluation in commercial pectin production. Thus, it is desirable to remove the oxalic acid and calcium oxalate residues from the extracted pectin. Accordingly, in particular embodiments the process further comprises exposing the solution of extracted pectin to a cation-exchanging resin before separating the extracted pectin from solution, thereby significantly reducing the oxalate and calcium residues in the final extracted pectin. Non-limiting examples of suitable cation-exchanging resins include Lewatit® S1668 and Lewatit® S1468 (Lanxess Deutschland GmbH, Leverkusen, Germany), Purolite® C100E (Purolite International Ltd., Llantrisant, United Kingdom), and Amberlite® SR1L Na (Rohm and Haas, Philadelphia, Pa.). The solution of extracted pectin may be at any suitable temperature and may be heated or cooled as required. For example, in embodiments the solution of extracted pectin is at a temperature from about 55 to about 70° C.

The pectins obtained using the processes provided herein have a higher degree of esterification (DE) and a higher degree of polymerization (DP) while being extracted in a higher yield than in conventional processes. Desirably, the extracted pectin has a degree of esterification of greater than or equal to 75 and a degree of polymerization that is characterized by an intrinsic viscosity of about 6.5 to about 9 dL/g. In particular embodiments, the extracted pectin has a degree of esterification of at least 76, at least 77, or at least 78, and a degree of polymerization that is characterized by an intrinsic viscosity of at least 7.0 dL/g, at least 7.5 dL/g, at least 7.8 dL/g, or at least 8.0 dL/g.

Those skilled in the art will appreciate, however, that the pectin properties depend on the species of plant material, maturity of the plant material, and delay before processing of the plant material. For example, in embodiment the pectin extracted from a high quality lemon peel has a degree of esterification of about 75-78 and an intrinsic viscosity of about 9 dL/g (as compared to a degree of esterification of 74-76 and an intrinsic viscosity of about 7.5 dL/g when extracted using conventional methods). In another embodiment, however, the pectin extracted from a low quality plant material has a degree of esterification of greater than 73 and an intrinsic viscosity of about 6.5 dL/g.

The processes provided herein desirably also provide a higher yield per peel than conventional pectin extraction methods. In particular embodiments, the yield per peel is greater than about 23, greater than about 25, or greater than about 27. Those skilled in the art will appreciate, however, that the expected yield is dependent upon the quality of raw material and the raw material's natural variations.

The yield per peel may be approximated from the following formula:

$$Y_P\% = 0.1 \cdot y_S \cdot M/W_P$$

in which $Y_P$ is the yield per peel in %, $Y_S$ is the yield of solution (liquid extract) in g/kg, M is the total mass of the extraction mixture just before filtration, and $W_P$ is the weight of peel that was used for the extraction mixture. Those skilled in the art will appreciate that this calculation of yield per peel is only an approximation because it ignores that a minor part of the total mass of the extraction mixture is not dissolved and, therefore, represents a volume within which the dissolved pectin does not distribute.

In particular embodiments, the value of the processes provided herein are characterized by the product of the yield per peel and intrinsic viscosity. Desirably, the product of the yield per peel and intrinsic viscosity of pectins obtained by the processes provided herein is greater than the product of the yield per peel and intrinsic viscosity of pectins obtained by conventional processes. For example, in particular embodiments the product of the yield per peel and intrinsic viscosity of pectins is greater than about 160, greater than about 165, greater than about 175, or greater than about 185.

The foregoing process improves upon prior art methods of pectin extraction by providing a method that (1) achieves a low viscosity during filtration while minimising pectin loss of degree of polymerization; (2) eliminates $Ca^{++}$ while reducing the need for regenerating ion-exchanging resin; (3) increases the yield of pectin as compared to the amount of spent raw material while minimising pectin loss of degree of polymerization; (4) reduces the amount of water that needs to be removed from the extracted pectin; and (5) reduces the residuals in the final product of the acid that was added for the extraction.

Not wishing to be bound by any theory, it is believed that the process provided herein achieves these desirable results in part by a specific balance of the extraction media selection (oxalic acid), pH, and temperature. In addition, it is believed that precipitation of a major portion of the $Ca^{++}$ ions as calcium oxalate reduces the tendency of the dissolved pectin to become viscous in the presence of $Ca^{++}$ ions, thereby reducing the viscosity of mixture during filtration and reducing the residual oxalic acid in the final product. The combination of good yield and low viscosity further makes it possible to operate with a relatively high pectin concentration in the filtrated liquid, thereby reducing the amount of water that must be removed from the pectin. Finally, the presence of residual oxalic acid in the final pectin is further reduced by exposing the liquid pectin extract to a cation-exchanging resin before precipitating the pectin from solution.

Embodiments of the present description are further illustrated by the following examples, which are not to be construed in any way as imparting limitations upon the scope thereof. On the contrary, it is to be clearly understood that resort may be had to various other embodiments, modifications, and equivalents thereof which, after reading the description therein, may suggest themselves to those skilled in the art without departing from the spirit of the present invention and/or the scope of the appended claims. Unless otherwise specified, quantities referred to by percentages (%) are by weight (wt %).

EXAMPLES

The following protocols were used to analyze the degree of esterification (DE), intrinsic viscosity (IV), the strength, residual calcium content, and residual oxalate content in the Examples below.

Protocol 1: Determination of Degree of Esterification

The degree of esterification was measured using the method set forth in FAO JECFA Monographs 4 (2007). 100 mL of the acid alcohol (100 mL 60% IPA+5 mL HCl fuming 37%) was added to 2.00 g of pectin while stirring with a magnetic stirrer for 10 min. The mixture was passed through a Büchner funnel with filter paper and the beaker was rinsed with 90 mL acid alcohol and also passed through the Büchner funnel with filter paper. The filtrate was then washed first with 1000 mL 60% IPA and thereafter with approximately 30 mL 100% IPA. The sample then was dried for approximately 15 min. on the Buchner funnel with vacuum suction.

Pectin samples weighing approximately 0.40 g were measured for duplicate determination (deviation between duplicate determinations must not exceed 1.5% absolute, otherwise the test was repeated). The pectin samples were first moistened with approximately 2 mL 100% IPA. Approximately 100 mL deionized water then was added to the moistened samples while stirring with a magnetic stirrer. The samples were then evaluated by titration, either by means of an indicator or by using a pHmeter/autoburette.

Titration Using Indicator.

5 drops of phenolphtalein indicator was added to the sample and it was titrated with 0.1 M NaOH until a change of colour was observed (record it as V1 titer). 20.0 mL 0.5 M NaOH was added while stirring and covered with foil for exactly 15 min. 20.0 mL 0.5 M HCl was added while stirring until the colour disappeared. 3 drops of phenolphtalein indicator then was added and it was titrated with 0.1 M NaOH until a change of colour was observed (record it as V2 titer). In order to compensate for possible inaccuracies of balancing the two portions of 20 mL of 0.5 M NaOH and HCl respectively, a so-called "blind measurement" was performed (i.e., 100 mL of o deionized water was treated in the same way as the sample solution, including the titrations). The last titration result was then recorded as B1 titer. The degree of esterification was then characterized by the following calculations.

$Vt=V1+(V2-B1)$

% DE (Degree of esterification)=$[(V2-B1)/Vt]*100$

Protocol 2: Determination of Intrinsic Viscosity

Samples were prepared using a Viscotek GPC max VE 2001 GPC solvent/sample module or AS 3500 auto sampler unless the samples were known to contain non-soluble material (in which case the samples were manually prepared). The molecular weight, intrinsic viscosity, and molecular weight distribution of pectin in the samples was then determined using size exclusion chromatography (SEC). The molecules were separated according to their size by gel permeation chromatography with the effluent from the chromatography column passing three detectors (RI, RALLS, and a viscosity detector). The Viscotek software converted the detector signals to molecular weight and intrinsic viscosity and calculated the weighted averages for the entire population.

Equipment:

Viscotek TDA 302 triple detector or TDA 305; Viscotek GPC max VE 2001 GPC solvent/sample module or AS 3500 auto sampler; Sample preparation module; Metler Toledo balance and Microlab. 500 dispenser; Pierce Reacti-Therm III heating/stirring module; Columns: BioBasis SEC60 (300×7.8), SEC120 (300×7.8), SEC300 (300×7.8) SEC1000 (300×7.8), all from Thermo, or Shodex guard SB400 G-8B, SB401-8F, SB402,5-8F, SB403-8F, SB404-8F; or in FIPA setup with either CPkelco Special (SuperDex Peptid from GE Health Care) or BioBasis SEC60 (150×7.8) from Thermo; RALLS detector (Right Angle Laser Light Scattering Detector); LALLS detector (Low Angle Laser Light Scattering Detector); RI Detector (Refractive Index); Viscometer Detector; Computer software: OmniSEC.

Manual Sample Preparation:

Samples known to contain non-soluble material were manually dissolved and centrifuged (10.000 G for 10 min.) and the supernatant was transferred to a new vial prior to injection.

Sample Preparation Using Sample Preparation Module, Metler Toledo Balance and Mikrolab. 500 Dispenser and Pierce Reacti-Therm III Heating/Stirring Module:

In the omniSEC software, the SASP program was used to prepare the samples before analysis. The amount/capacity ratio was approx 30 mg powder to 15 ml eluent (2 mg per ml) in 20 ml vials. After preparing the sample, the vials were placed for 30 minutes at 70° C. in the heating stirring module.

Sample Preparation Using Balance and Heating/Stirring Module when Using AS 3500 Auto Sampler:

Approximately 2.0 mg pectin was weighed in an auto sampler vial and placed in the auto sampler rack. Using template 4 from the AS3500 auto sampler, the following units were used: Dilution cycles: 3; Heater: ON Temp: 70° C.; Load 20 μl solvent S-1 (S-1=96% ethanol); Add 10 μl to sample; Load 1500 μl solvent S-2 (S-2=0.3 M Li-acetate buffer); Add 1300 μl to sample (0.1% pectin solution—1 mg/ml); Mix for 9.9 minutes; Mix for 9.9 minutes; Wait for 10.0 minutes; Enable Overlay: YES (starts the next sample preparation before end of analysis for running sample). The run time at the auto sampler was set at 50 minutes and a 100 μL full loop injection was used. When the auto sampler was used, the sample was automatically filtrated by a 0.5 μm in-line filter placed after the auto sampler loop.

Protocol 3: Determination of Pectin Strength (YogSimBuf method)

YOG SIM BUF pH 3.75 Buffer (2000 mL).

A buffer was prepared by dissolving 13.03 g calcium lactate ($C_6H_{10}O_6Ca$, $5*H_2O$), 2.79 g di-potassium hydrogen phosphate ($K_2HPO_4$), 2.00 g sodium benzoate, 2.03 g potassium-di-hydroxide-phosphate ($KH_2PO_4$), 40.00 g lactose ($C_{12}H_{22}O_{11}$), 300.00 g sucrose ($C_{12}H_{22}O_{11}$). 7.23 g lactic acid (90%) was weighed out and added to the solution and the beaker was rinsed with ion-exchanged water. Finally, 0.43 g sodium hydroxide (NaOH) was dissolved in the flask and the solution was diluted to 2000 mL with deionized water. The buffer solution pH was adjusted by adding citric acid until a pH reading of 3.68±0.02 was obtained, which resulted in a pH of 3.75±0.05 in the final pectin-buffer system. This buffer solution was stable until precipitation.

Pectin Stock Solution (1.2%) (100 mL).

A pectin stock solution was prepared by moistening 1.20 g pectin with 5.00 ml 100% IPA in a flask. While stirring, 95 ml boiling deionized water (>85° C.) was added to the flask and the mixture was placed on a water bath/block heater at 75° C. for 30 min. while stirring. The solution was cooled to room temperature and deionized water was added to dilute the solution to 100.0 g.

The buffer solution, pectin stock solution and deionized water were maintained at a temperature of 23±2° C. The pectin stock solution was diluted with deionized water according to the table below.

| Pectin conc. In final system % | Deionized water (g) | Pectin stock solution (1.2%) (g) |
|---|---|---|
| 0 | 15.0 | 0 |
| 0.02 | 14.5 | 0.5 |
| 0.04 | 14.0 | 1.0 |
| 0.06 | 13.5 | 1.5 |
| 0.08 | 13.0 | 2.0 |
| 0.10 | 12.5 | 2.5 |
| 0.12 | 12.0 | 3.0 |
| 0.14 | 11.5 | 3.5 |
| 0.16 | 11.0 | 4.0 |
| 0.18 | 10.5 | 4.5 |
| 0.20 | 10.0 | 5.0 |
| 0.22 | 9.5 | 5.5 |
| 0.24 | 9.0 | 6.0 |
| 0.26 | 8.5 | 6.5 |
| 0.28 | 8.0 | 7.0 |
| 0.30 | 7.5 | 7.5 |
| 0.32 | 7.0 | 8.0 |
| 0.34 | 6.5 | 8.5 |
| 0.36 | 6.0 | 9.0 |
| 0.38 | 5.5 | 9.5 |
| 0.40 | 5.0 | 10.0 |
| 0.42 | 4.5 | 10.5 |
| 0.44 | 4.0 | 11.0 |
| 0.46 | 3.5 | 11.5 |
| 0.48 | 3.0 | 12.0 |
| 0.50 | 2.5 | 12.5 |
| 0.52 | 2.0 | 13.0 |
| 0.54 | 1.5 | 13.5 |
| 0.56 | 1.0 | 14.0 |
| 0.58 | 0.5 | 14.5 |
| 0.60 | 0 | 15.0 |

15 ml of the buffer was added to the diluted pectin solution while stirring at a speed sufficient to provide a vortex of approximately 1 cm for a total of 25 seconds. After 1 minute, the solution was analyzed using a Brookfield LVT with adaptor at 6 rpm (factor 1). The pectin-buffer solution also was visually evaluated to characterize its appearance (i.e., presence or absence of any gel lumps, inhomogeneous appearance, etc.). The process is repeated at various dilutions until the following data points are identified: (1) a concentration with a viscosity between 18-25 mPa·s, and (2) a concentration between 25 and 35 mPa·s. The reading was valid if the pH on the solutions between 25 and 35 mPa·s was between 3.70 and 3.80.

The raw result after following the above procedure consisted of two datapoints ($c_1$, $\eta_1$) and ($c_2$, $\eta_2$) with which 18 mPa·s≤$\eta_1$≤25 mPa·s and 25 mPa·s≤$\eta_2$≤35 mPa·s. The method result, $c_\dagger$, was calculated as follows, provided that the viscosities were entered in the unit mPa·s:

$$c_\dagger = c_1 + (c_2 - c_1) \cdot (\ln(25/\eta_1))/(\ln(\eta_2/\eta_1))$$

Protocol 4: Determination of Residual Calcium Content

Approximately 0.5 g extracted pectin was used to evaluate the presence of residual calcium. The samples were digested with nitric acid (65%) and hydrogen peroxide (30) in a microwave oven digestor as prescribed by the manual. After digestion, the reaction vessels were left to cool in a fume hood. The samples were then transferred to a 50-mL measuring flask. When measuring residual calcium, it was necessary to add cesium chloride to avoid interference (1 mL 2.5% CsCl-solution per 10 mL solution to make the solution approx. 2000 ppm in Cs). The acid concentration (HNO3) in the measuring solutions was from 3% to 10%. The emission intensity of the samples was then measured. If it was not within the emission intensity of the standards, the samples were appropriately diluted.

Protocol 5: Determination of Residual Oxalate Content

Approximately 0.2 g extracted pectin was used to evaluate the presence of residual oxalate. 2-propanol (1 mL) was added to the extracted pectin and the mixture was stirred until the pectin was moistened. Milli-Q deionized water (40 mL) was subsequently added while agitating. The samples were heated to 90° C. in a closed bottle for between 30 and 60 minutes and then cooled to room temperature. The samples were then evaluated using HPLC chromatography (Apparatus: Waters TM600 with refractive index detector and conductivity detector; Flow: 1.4 mL/minute; Temperature: 40° C.; Injection: 100 or 200 mL full loop; Eluent: 0.85 mM $NaHCO_3$+0.9 mM $Na_2CO_3$ in deionized water).

The quantitative response of the conductivity detector to oxalic acid passing by the detector was quantified as the area (the "integrated detector response") in a diagram (x-axis=time, y-axis=detector response). The integrated detector response was delimited by a straight baseline before and after the peak in accordance with usual practices and conventions in the art. The integrated detector responses from the unknown samples were then compared to a linear calibration curve of the integrated detector responses from known samples of oxalic acid dihydrate in deionized water x-axis=concentration, y-axis=integrated detector response), and the corresponding concentration of oxalic acid was inferred from the linear calibration curve.

Example 1

Lemon pectin was extracted from a dried lemon peel from the Tucuman province of Argentina. The fruit was harvested in 2009, after which the fruit was cut open and utilized for production of citrus juice and citrus peel oil. The fruit leftovers were then chopped and washed several times in water for leaching away a large part of the natural soluble materials, like sucrose, and subsequently dried. These routine operations were performed by the peel supplier.

The lemon peel was subsequently used in an exemplary extraction process (illustrated in FIG. 1) to extract pectin from the lemon peel. The dried lemon peel (1000 g) was suspended in a mixture of 20 L of water, 30.0 g oxalic acid di-hydrate, and 2.90 g NaOH. This mixture was incubated with very gentle stirring for 60 minutes at 72.5° C. ("Mixture A"). Mixture A then was diluted with a suspension of 400 g wood cellulose (an insoluble filtration aid) in 20 L of hot water, and the incubation and gentle agitation was continued for 60 minutes at 75.0° C. ("Mixture B"). Mixture B then was poured onto a filter-cloth in a Büchner funnel in order to separate the solution ("Solution C") from the materials that did not dissolve (which together with the solution that could not be separated is referred to as "Mixture D").

Solution C then was further filtered through a bed of Filtercel 450 (a filter-aid used for removing haze) and stirred with Lewatit ionic exchanging resin. The solution obtained after draining away the resin ("Solution E") was poured into about three parts (i.e., three times its own volume) of 80% 2-propanol. The precipitate was squeezed for removing as much of the spent alcohol as possible, and was then washed in a mixture of 60% 2-propanol and 40% water before being squeezed again. The volume of the mixture used for washing the precipitate was about the same as the volume of Solution E. Following the washings, the precipitate was dried, milled and sieved through a 250µ pore-size powder-sieve.

The pH of an aliquot of Mixture B was 3.52 after cooling to 25° C. The amount of dried pectin that could be isolated per kg of Solution E was 5.71 g. In the present example, the total mass of the extraction mixture just before filtration, weight of peel used for the extraction mixture, and yield per peel were calculated as follows:

$$M=1+20+0.03+0.0029+0.400+20 \text{ kg}=41.4 \text{ kg}.$$

$$W_P=1 \text{ kg}.$$

$$Y_P\%=0.1\cdot5.71\cdot41.4/1=23.6$$

The pectin also was analyzed in the laboratory to determine the degree of esterification (DE) and the intrinsic viscosity (IV) (Protocols 1 and 2 described above, respectively). The pectin had a DE=76.4 and IV=7.83 dL/g. The product of yield times intrinsic viscosity, which provides a more relevant metric for value, was 186.

In addition, the strength of the pectin was measured using the YogSimBuf method, which expresses the concentration of pectin at which the solution attains a viscosity of 25 mPa·s. (Protocol 3 described above). The YogSimBuf (YSB) for the lemon peel extracted pectin was 2.51 g/L.

Example 2

Comparative

Figure 2:
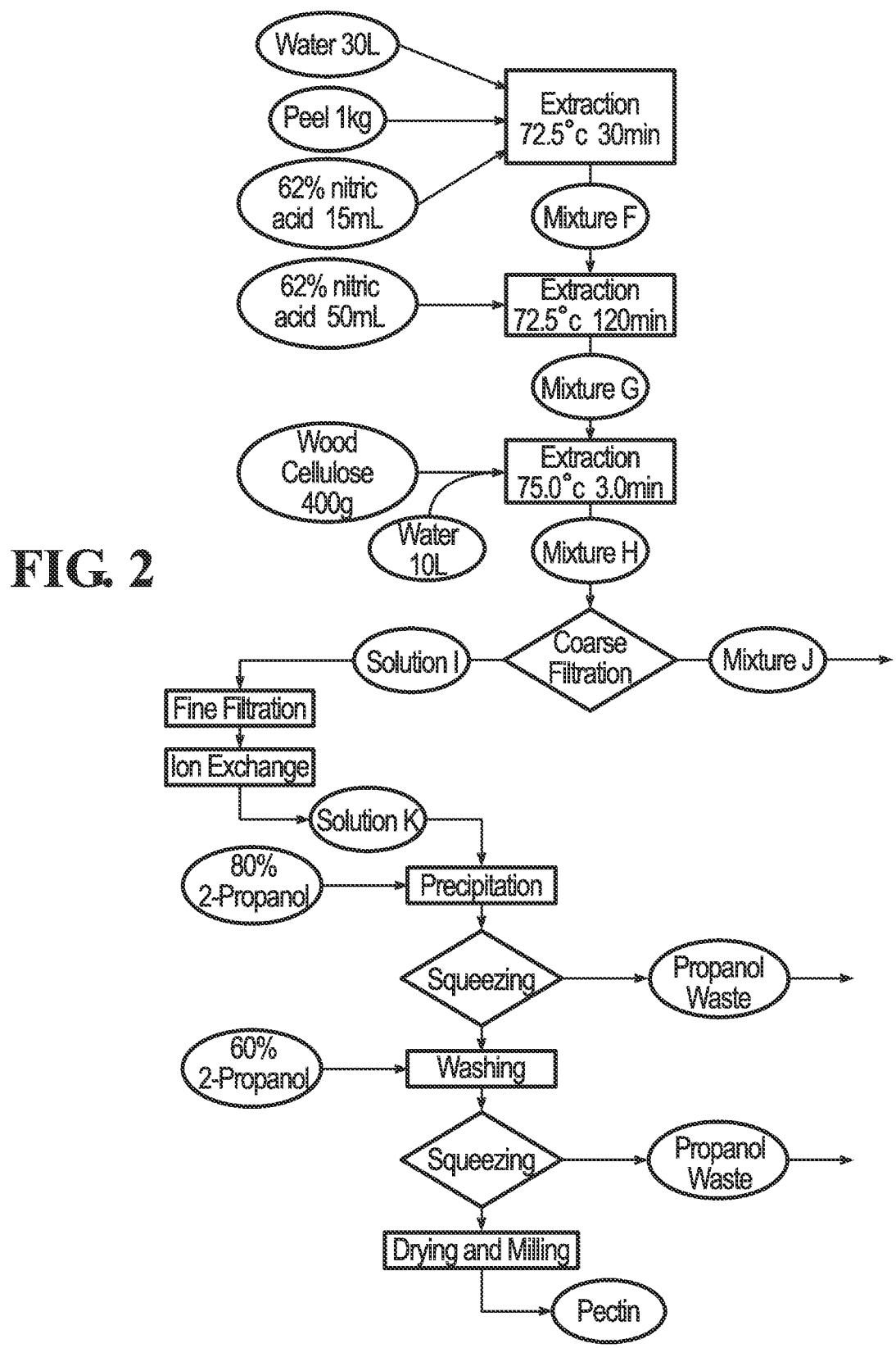
FIG. 2 is a schematic illustration of a conventional system for extracting pectin.

The same lemon peel described in Example 1 was used in a conventional pectin extraction process (illustrated in FIG. 2). The dried lemon peel (1000 g) was suspended in a mixture of 30 L of water and 15 mL of 62% nitric acid, and incubated with very gentle stirring for 30 minutes at 72.5° C. ("Mixture F"). A further 50 ml of 62% nitric acid was added to Mixture F and the incubation at 72.5° C. was continued for 120 minutes ("Mixture G"). Mixture G was diluted with 10 L hot water plus 400 g wood cellulose and incubated for 30 minutes at 75° C. ("Mixture H"). Mixture H was then poured onto a filter-cloth in a Buchner funnel in order to separate the solution ("Solution I") from the materials that did not dissolve (which together with the solution that could not be squeezed away from the materials is referred to as "Mixture J").

Solution I was then further filtered through a bed of Filtercel 450 (a filter-aid, used for removing haze) and stirred with Lewatit ionic exchanging resin. The solution obtained after draining away the resin ("Solution K") was poured into about three parts (i.e., three times its own volume) of 80% 2-propanol. The precipitate was squeezed for removing as much of the spent alcohol as possible, and was then washed in a mixture of 60% 2-propanol and 40% water before being squeezed again. The volume of the mixture used for washing was about the same as the volume of Solution K. Following the washings, the precipitate was dried, milled and sieved through a 250µ pore-size powder-sieve.

The pH of an aliquot of mixture H was 2.05 after cooling to 25° C. The amount of dried pectin that could be isolated per kg of solution K was 5.95 g. Using the same symbols and formula as Example 1, the total mass of the extraction mixture just before filtration and yield per peel were calculated as follows:

$$M=30+1+0.015+0.050+0.4+10=41.5$$

$$Y_P=24.7.$$

Both the DE and IV were measured using the same protocols described above. The pectin had a DE=74.6 and IV=6.59 dL/g. The product of yield times intrinsic viscosity was 163 (only 88% of that of Example 1). The YogSimBuf was calculated as 3.24 g/L, which suggests that the strength of the pectin extracted using the conventional process was only 77% of that of Example 1 (keeping in mind that "low" means "strong").

Example 3

The same method described in Example 1 was used to evaluate the effect of the dosage of oxalic acid, pH, and temperature on extraction of lemon peel. A series of 24 similar experiments were conducted in which the dosing of oxalic acid dihydrate was varied at four levels (15, 20, 25, and 30 g per kg of dried peel) and the intended pH was varied at three levels (2.70, 3.00, and 3.30) by either adding nitric acid or sodium hydroxide alongside with the oxalic acid. The pH values that were actually achieved, however, were slightly different from the intended values (see below). In addition, the temperature was varied at two levels (70 and 80° C.).

In all experiments, 1000 g dried peel obtained from the same source as Examples 1 and 2 was suspended with the specified amounts of other ingredients in 20 L water for 60 minutes at the stipulated temperature. The mixture was diluted with 20 L more water and incubated for 60 minutes at the same temperature, and finally filtered and analyzed like described in Example 1, except that the extract was not contacted with an ion-exchanging resin (i.e., meaning that the pectin produced in Example 3 contained more residual calcium than that of Examples 1 and 2). The total calcium mg/g in the pectin was determined using Protocol 4, described above.

The experimental conditions and results are summarized below:

| | Experiment number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| oxalic acid (g) | 30 | 30 | 30 | 15 | 15 | 15 | 20 | 20 | 20 | 25 | 25 | 25 |
| nitric acid (ml 62%) | 6 | 0 | 0 | 16 | 10 | 4 | 12 | 6 | 1 | 9 | 3 | 0 |
| 1N NaOH (ml) | 0 | 0 | 73 | 0 | 0 | 0 | 0 | 0 | 0 | 0 | 0 | 24 |
| temperature (° C.) | 70 | 70 | 70 | 70 | 70 | 70 | 70 | 70 | 70 | 70 | 70 | 70 |
| Extn. mix. pH at 25° C. | 2.70 | 2.96 | 3.19 | 2.66 | 3.01 | 3.27 | 2.67 | 2.95 | 3.37 | 2.75 | 2.97 | 3.17 |
| Yield % pectin/peel | 20.00 | 20.12 | 20.99 | 15.76 | 14.36 | 13.04 | 17.76 | 16.96 | 17.17 | 19.37 | 18.88 | 19.40 |
| DE | 77.90 | 77.50 | 77.50 | 78.50 | 78.70 | 79.30 | 78.20 | 78.60 | 78.70 | 78.20 | 78.30 | 78.20 |
| IV (dL/g) | 8.0 | 8.1 | 7.8 | 7.4 | 8.1 | 8.5 | 7.8 | 8.2 | 8.0 | 7.6 | 7.9 | 7.9 |
| YogSimBuf (g/L) | 2.65 | 2.54 | 2.45 | 3.39 | 3.41 | 3.26 | 3.12 | 3.05 | 2.77 | 2.85 | 3.07 | 2.88 |
| Calcium (mg/g) | 3.9 | 3.3 | 2.7 | 8.3 | 7.3 | 6.1 | 6.2 | 5.8 | 5.4 | 3.8 | 3.1 | 3.1 |

| | Experiment number | | | | | | | | | | | |
|---|---|---|---|---|---|---|---|---|---|---|---|---|
| | 12 | 14 | 15 | 16 | 17 | 18 | 19 | 20 | 21 | 22 | 23 | 24 |
| oxalic acid (g) | 30 | 30 | 30 | 15 | 15 | 15 | 20 | 20 | 20 | 25 | 25 | 25 |
| nitric acid (ml 62%) | 6 | 0 | 0 | 16 | 10 | 4 | 12 | 6 | 1.2 | 9 | 3 | 0 |
| 1N NaOH (ml) | 0 | 0 | 72 | 0 | 0 | 0 | 0 | 0 | 0 | 0 | 0 | 24 |
| temperature (° C.) | 80 | 80 | 80 | 80 | 80 | 80 | 80 | 80 | 80 | 80 | 80 | 80 |
| Extn. mix. pH at 25° C. | 2.73 | 2.97 | 3.18 | 2.66 | 2.89 | 3.29 | 2.72 | 2.95 | 3.23 | 2.87 | 3.11 | 3.27 |
| Yield % pectin/peel | 23.76 | 26.72 | 26.35 | 21.36 | 18.72 | 18.88 | 22.65 | 21.54 | 21.83 | 23.66 | 25.04 | 25.24 |
| DE | 77.50 | 77.10 | 76.60 | 78.20 | 78.70 | 78.80 | 77.60 | 77.80 | 78.10 | 77.50 | 77.40 | 77.40 |
| IV (dL/g) | 6.7 | 6.4 | 6.9 | 6.3 | 6.7 | 7.0 | 6.6 | 6.6 | 6.7 | 6.3 | 6.9 | 6.9 |
| YogSimBuf (g/L) | 3.52 | 3.49 | 3.07 | 4.53 | 4.30 | 4.42 | 3.96 | 4.03 | 3.73 | 3.50 | 3.36 | 3.32 |
| Calcium (mg/g) | 2.4 | 2.7 | 2.3 | 5.0 | 4.9 | 4.7 | 5.6 | 3.9 | 4.2 | 3.5 | 2.7 | 2.3 |

These results may be better understood in graphical form, as set forth in FIGS. 3-7 and described below.

Figure 3:
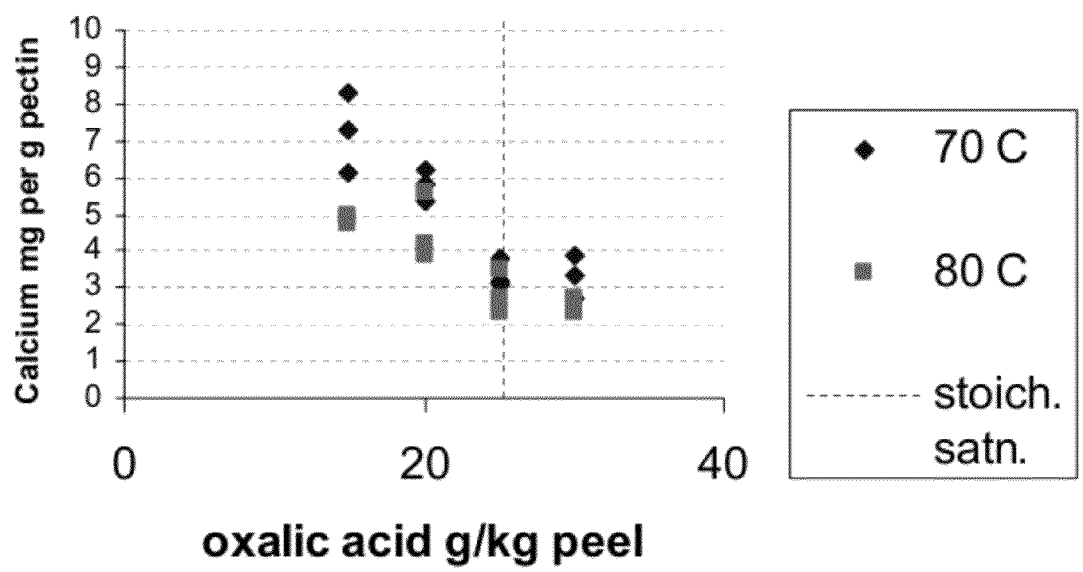
FIG. 3 is a graph illustrating the calcium content of pectin as a function of the dosage of oxalic acid.

FIG. 3 shows the calcium content of the experimental pectin samples as a function of the dosage of oxalic acid in g of $(COOH)_2 \cdot 2H_2O$, M=126.1 per kg peel. Not wishing to be bound by any theory, it is believed that because the peel contained 8.0 mg $Ca^{++}$ per g peel, the stoichiometric balance between oxalate acid and calcium should occur at the dosage 25.2 g oxalic acid di-hydrate. What was observed was that the more oxalic acid used for the extraction, the less calcium residual was found in the ensuing pectin samples until levelling off after exceeding a stoichiometric balance. In particular, less calcium was found in pectin that was extracted at 80° C., likely because the yield of pectin was larger at this temperature as compared to 70° C. and the calcium residual was therefore mixed with a larger relative amount of pectin at the higher temperature.

Figure 4:
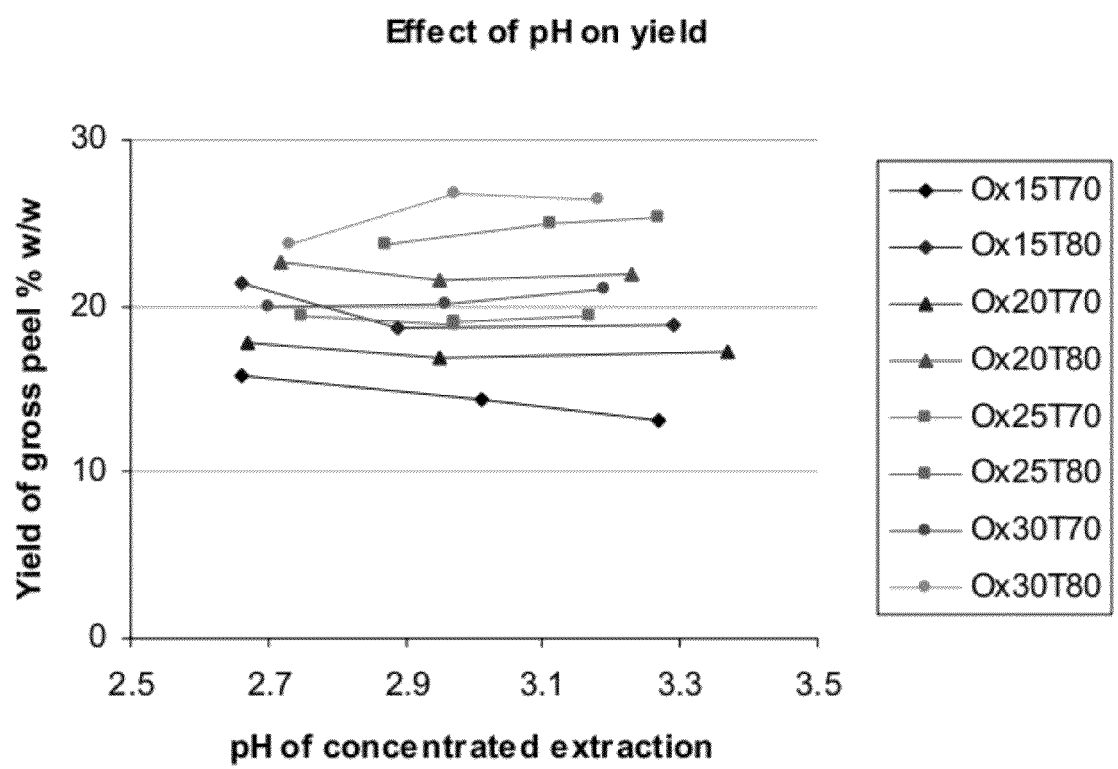
FIG. 4 is a graph illustrating the effect of pH upon pectin extraction yield.

FIG. 4 shows the effect of pH upon extraction yield with individual curves for the eight possible combinations of the four oxalic acid dosages and two temperatures. As can be seen from the graphical illustration, the yield was not strongly dependant upon the extraction pH within the ranges of pH and oxalic acid dosing that were tested in this series of experiments. However, there was a pronounced tendency for the yield to be higher at 80° C. than at 70° C. The yield also tended to be higher with the high oxalic acid dosages as compared to the lower ones. For example, the yield for extraction with 30 mg/g oxalic acid at 70° C. was higher than the yield for 15 mg/g at 80° C.

Figure 5:
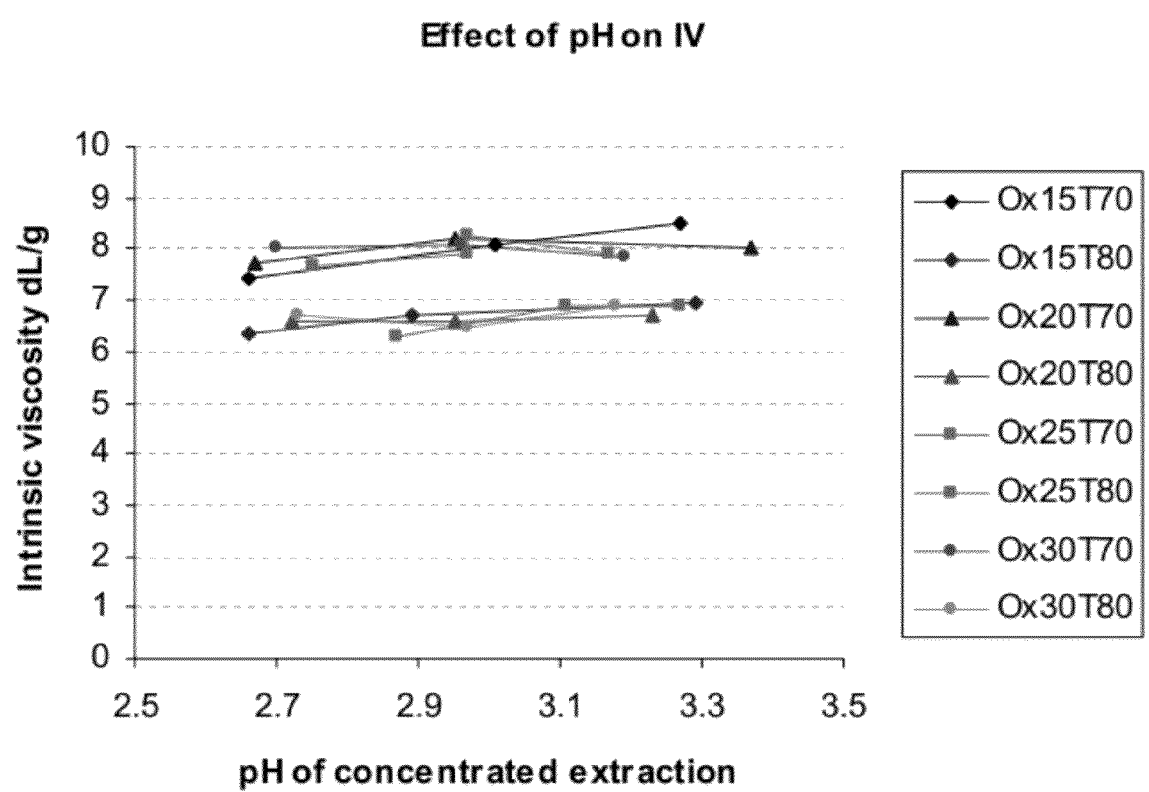
FIG. 5 is a graph illustrating the intrinsic viscosity of extracted pectin as a function of pH.

FIG. 5 shows the intrinsic viscosity as a function of pH with individual curves for each of the eight combinations of the four dosages and two temperatures. As can be seen from the graphical illustration, the highest intrinsic viscosity results were obtained at the lowest extraction temperature. In addition, on average, the samples extracted at the lowest pH had a lower intrinsic viscosity than those extracted at the highest pH. When this data is interpreted without considering data from other investigations, however, the relationship between pH and intrinsic viscosity is uncertain and may be interpreted in more than one way. Not wishing to be bound by any theory, it is believed that the intrinsic viscosity can be influenced by a gradual thermal decay of dissolved pectin as well as by possible differences between the pectin that is released willingly and the pectin that releases only in the extractions with high yield, respectively.

Figure 6:
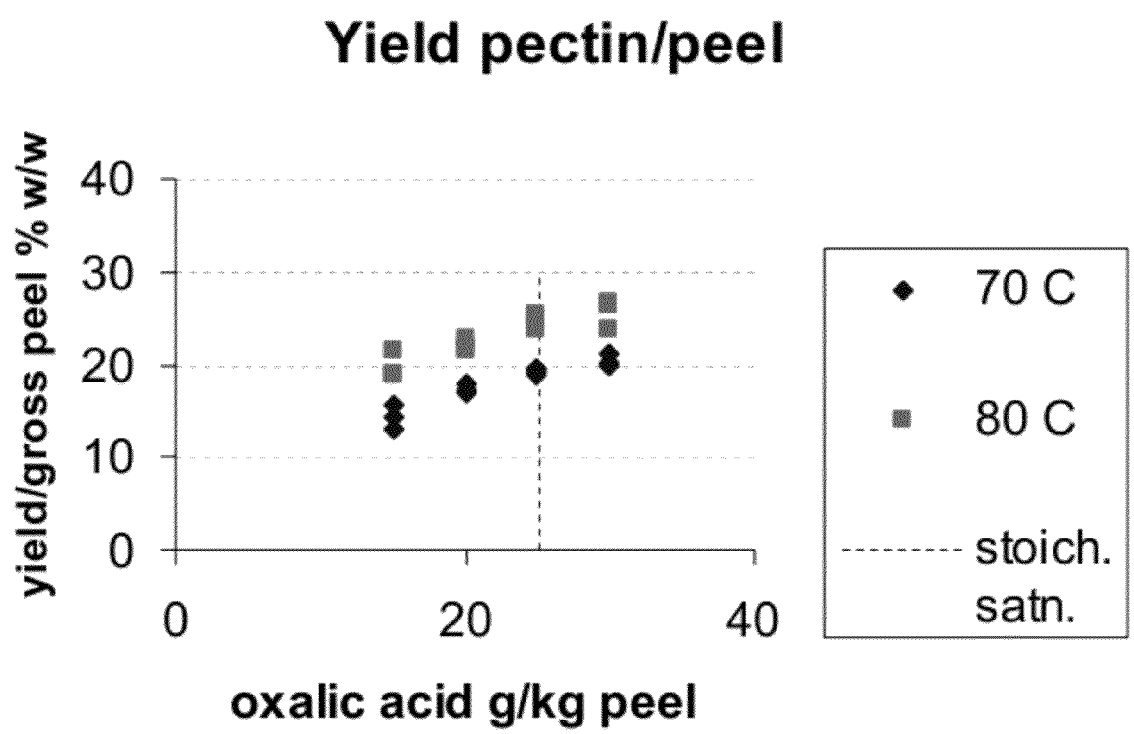
FIG. 6 is a graph illustrating the dosage of oxalic acid and the yield of pectin in percent of the peel.

FIG. 6 shows as independent parameter the dosage of oxalic acid and as dependent parameter the yield of pectin in percent of the peel. The highest yield was obtained at the highest oxalic acid dosage. The data of FIG. 4, however, seems to suggest that the yield is more an effect of the extraction media (i.e., oxalic acid) rather than an acidity (pH) effect.

Figure 7:
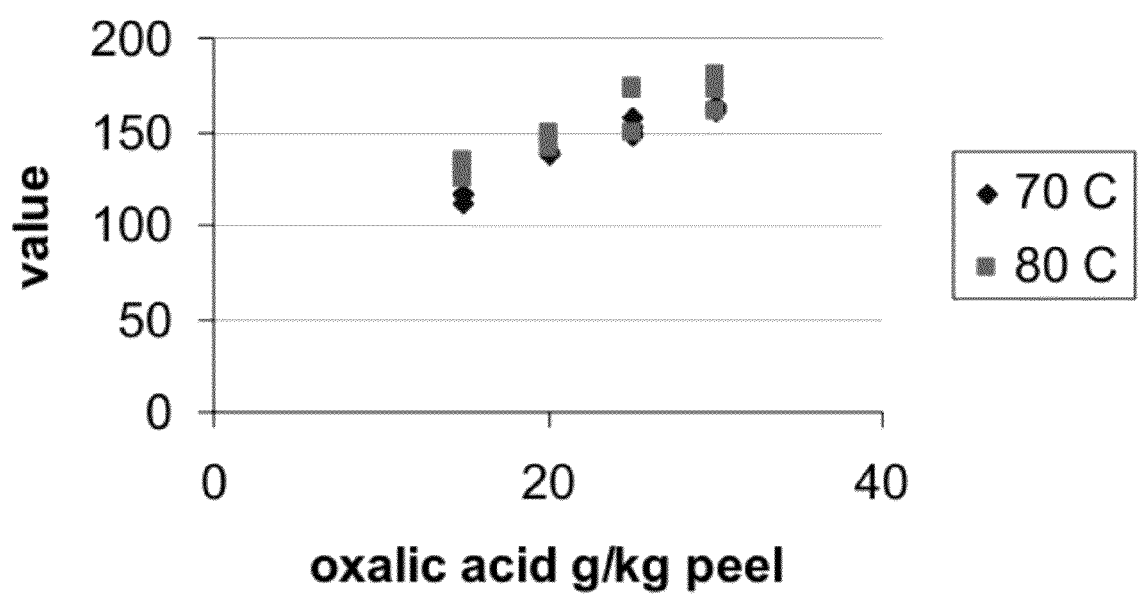
FIG. 7 is a graph illustrating the product of (pectin yield times pectin intrinsic viscosity) as a function of the oxalic acid dosage.

FIG. 7 shows the product of yield times intrinsic viscosity as a function of the oxalic acid dosage. The value of the yield increased with the dosage of oxalic acid and became less dependent upon the extraction temperature.

Example 4

Further experiments were conducted to evaluate the reduction of oxalate in the final pectin by contacting the aqueous extract with cationic-exchanging resin. The same process was used as described in Example 1, except the Filtercel-filtrated Solution C was divided into two about equally large portions, one portion being treated with a Lewaitit ion-exchanging resin as described in Example 1 and one portion with which the Lewaitit treatment was omitted. Both of these solutions were subsequently treated as described for Solution E in Example 1. The calcium content and oxalate content of the final pectin were subsequently analyzed using Protocols 4 and 5, respectively, each described above.

|  | Residual Oxalate Content | | Residual Calcium Content | |
| --- | --- | --- | --- | --- |
|  | With ion-exchange (mg oxalate/ g pectin) | Without ion-exchange (mg oxalate/ g pectin) | With ion-exchange (mg calcium/ g pectin) | Without ion-exchange (mg calcium/ g pectin) |
| Experiment A | below detection limit | 2.29 | 0.17 | 2.08 |
| Experiment B | below detection limit | 2.17 | 0.09 | 1.71 |
| Average | below detection limit | 2.23 | 0.13 | 1.90 |

As can be seen from the foregoing, use of the ion-exchanging resin effectively eliminated oxalate residue from the final pectin.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereof.

The invention claimed is:

1. A process for extracting pectin having a high degree of polymerization comprising:
   adding oxalic acid and/or a water-soluble oxalate to an aqueous suspension of a peel in an amount sufficient to provide a mixture having a pH of between 3.0 and 3.6 and a total molarity of oxalate greater than a total molarity of calcium (II) in the peel;
   heating the mixture to a temperature from about 50 to about 80° C. for a time sufficient to extract a pectin; and
   separating the extracted pectin from the mixture by precipitating the extracted pectin from the mixture, wherein the extracted pectin has a degree of esterification (DE) of at least 72 and a high degree of polymerization as characterized by an intrinsic viscosity of greater than about 6.5 dL/g.

2. The process according to claim 1, wherein the pH of the mixture prior to separating the extracted pectin from the mixture is between 3.1 and 3.4.

3. The process according to claim 2, wherein the mixture is heated to a temperature from about 70 to about 80° C. during the separating of the extracted pectin.

4. The process according to claim 1, further comprising filtering the mixture to remove insoluble solids after extracting the pectin and prior to separating the extracted pectin.

5. The process according to claim 1, further comprising contacting the mixture containing the extracted pectin with a ion-exchanging resin prior to separating the extracted pectin.

6. The process according to claim 5, wherein the ion-exchanging resin comprises a cation-exchanging resin effective to remove oxalate residues, calcium residues, or combinations thereof from the extracted pectin.

7. The process according to claim 5, wherein the extracted pectin has a total oxalate content less than 2.0 mg per 1 g of pectin.

8. The process according to claim 5, wherein the extracted pectin has a total calcium content less than 1 mg/g.

9. The process according to claim 1, further comprising one or more of the steps of washing, pressing, drying, and milling the extracted pectin after separating the extracted pectin to obtain a final pectin product.

10. The process according to claim 1, wherein the yield per peel (Yp) is greater than about 23%, wherein $Yp = 0.1 \cdot y_S \cdot M/W_P$ and $y_S$ is the yield of solution (liquid extract) in g/kg, M is the total mass of the mixture before separating the extracted pectin, and $W_P$ is the weight of the peel used in the aqueous suspension.

11. The process according to claim 10, wherein the product of the yield per peel and intrinsic viscosity is greater than about 165%·dL/g.

12. The process according to claim 1, wherein the extracted pectin has a degree of esterification (DE) of at least 75.

13. The process according to claim 1, wherein the extracted pectin has an intrinsic viscosity (IV) of at least 7.8 dL/g.

14. The process according to claim 1, wherein the extracted pectin has an intrinsic viscosity (IV) of at least 8.5 dL/g.

15. A process for extracting pectin having a high degree of polymerization consisting essentially of:
   adding oxalic acid and/or a water-soluble oxalate to an aqueous suspension of a peel in an amount sufficient to provide a mixture having a pH of between 3.0 and 3.6 and a total molarity of oxalate greater than a total molarity of calcium (II) in the peel;
   heating the mixture to a temperature from about 50 to about 80° C. for a time sufficient to extract a pectin;
   optionally filtering the mixture to remove insoluble solids;
   contacting the mixture containing the extracted pectin with a cation-exchanging resin; and
   separating the extracted pectin from the mixture by precipitating the extracted pectin from the mixture to obtain a yield per peel (Yp) greater than about 23%, wherein $Yp = 0.1 \cdot y_S \cdot M/W_P$ and $y_S$ is the yield of solution (liquid extract) in g/kg, M is the total mass of the mixture before separating the extracted pectin, and $W_P$ is the weight of the peel used in the aqueous suspension;
   wherein the extracted pectin has a degree of esterification (DE) of at least 72, a high degree of polymerization as characterized by an intrinsic viscosity of greater than about 6.5 dL/g.

16. The process according to claim 15, wherein the extracted pectin has a total oxalate content less than 2.0 mg per 1 g of pectin.

17. The process according to claim 15, wherein the extracted pectin has a total calcium content less than 1 mg/g.

18. The process according to claim 15, wherein the time sufficient is from about 1 hour to about 3 hours.

19. The process according to claim 15, wherein the extracted pectin has a degree of esterification (DE) of at least 75.

20. The process according to claim 15, wherein the extracted pectin has an intrinsic viscosity (IV) of at least 7.8 dL/g.

* * * * *